March 26, 1935.  E. B. FOOTE  1,995,385
TEMPERATURE RESPONSIVE DEVICE
Filed March 30, 1932
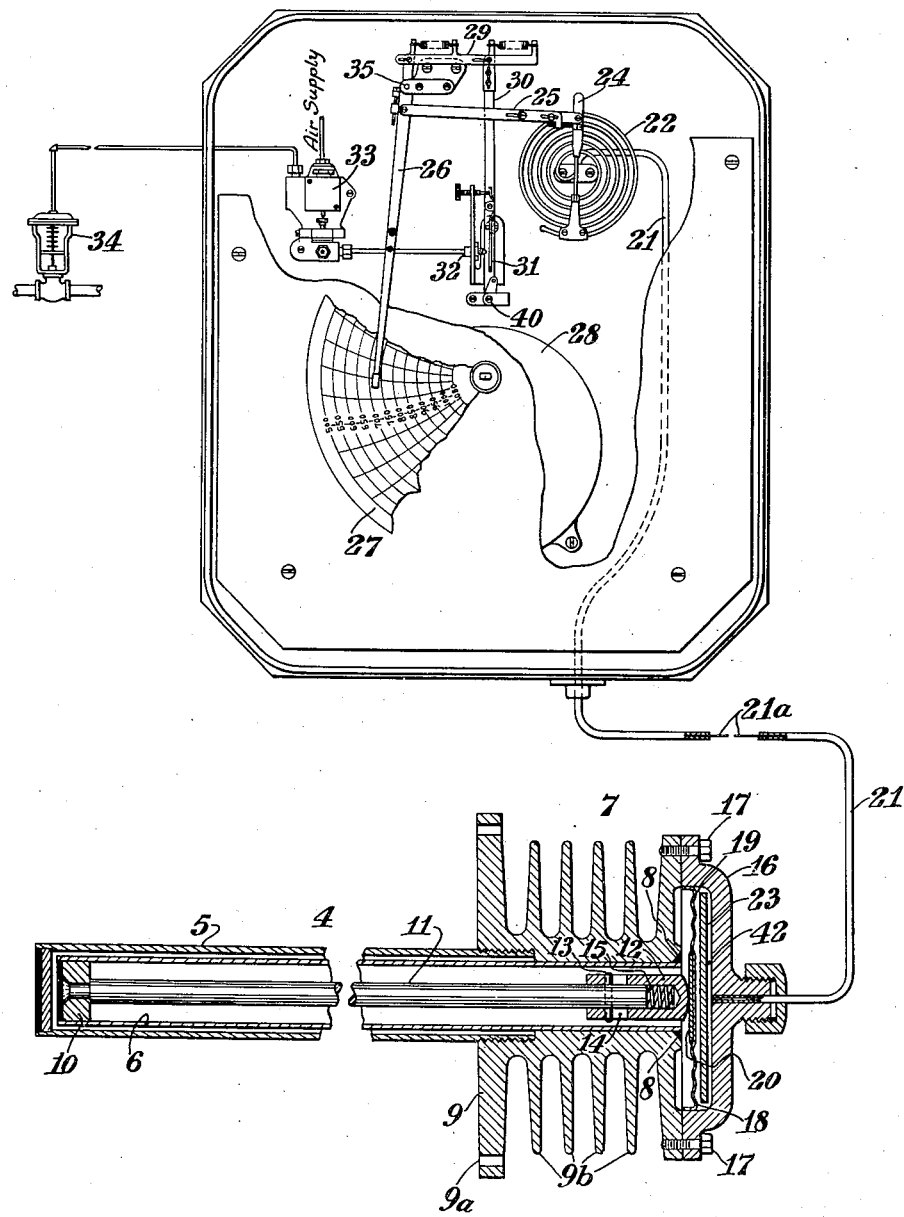
INVENTOR
Edward B. Foote
BY D. Clyde Jones
ATTORNEY Patented Mar. 26, 1935

1,995,385

UNITED STATES PATENT OFFICE 1,995,385

TEMPERATURE RESPONSIVE DEVICE

Edward B. Foote, Rochester, N. Y., assignor to Taylor Instrument Companies, Rochester, N. Y., a corporation of New York Application March 30, 1932, Serial No. 602,095

3 Claims. (Cl. 297—14)

This invention relates to actuating systems for temperature-responsive devices, including temperature indicators, temperature recorders, temperature regulators and the like.

In temperature-responsive instruments of one type it has been customary to use an actuating system filled with a liquid such as mercury, or with a liquid and gas, or else with inert gas, but the field of use of such devices has been limited to a relatively low range since at the higher temperatures the material of the bulb weakens, while at the same time the pressure in the system greatly increases, causing breakdown thereof. For the lower ranges of temperatures, however, such systems have been well adapted for use in temperature-responsive devices, especially where the indicating, recording or regulating portion thereof is remotely placed with respect to the temperature bulb of the system.

A second type of temperature-responsive device employing the differential expansion of two solids, such as metals, while satisfactory at much higher temperatures than those to which devices of the first type satisfactorily respond, has had the disadvantage that it did not lend itself to use in distant indicating, regulating or recording devices. For this reason remote indicating, recording and regulating temperature-responsive devices for the higher ranges of temperature have usually taken the form of a thermocouple and a sensitive electrical measuring instrument calibrated in temperature. Such thermocouple devices are delicate and expensive, and since the E. M. F. developed by a thermocouple is very small, it is usually necessary in addition thereto, to employ mechanical relay devices or other relays such as vacuum tubes in order to develop sufficient power to actuate the pen or other marking element of a recorder, or to actuate movable elements of a regulator.

In accordance with the present invention, it is proposed to overcome the disadvantage of former temperature responsive devices by utilizing the differential expansion of two solids, to actuate mechanically a liquid or fluid transmission system including a pressure spring or diaphragm which, in turn, operates the indicating or regulating mechanism of a temperature-responsive device.

In a single figure there is illustrated a front view of a recorder with portions thereof broken away to disclose its operating mechanism, and there is also illustrated a longitudinal section of a temperature responsive element, which is connected by a capillary tube to said mechanism.

For a clearer understanding of the invention, reference is made to the drawing in which 4 designates generally a bulb or other temperature-responsive element which is to be exposed to the temperature that is to be indicated, recorded or regulated. As herein shown, this element has an outer shell 5 of heat-resisting material such as porcelain or calorized steel which is screw threaded into a head generally designated 7. Within the shell 5 there is provided a hollow stem which is secured to the head 7 in any suitable manner such as by spot welding, indicated at 8 herein. This stem may be formed of brass or bronze for the lower ranges of temperature or may be formed of nickel or similar metal for the higher ranges of temperature. The free end of the stem 6 is closed by a plug 10 welded therein, which plug has one end of an inside stem 11 secured thereto in any suitable manner such as by being riveted in an opening therein. The inside stem 11 may be formed of invar or any other material having a different coefficient of expansion from that of the stem 6. On the free end of the inner stem 11 there is slidably mounted a telescoping contactor 12, the movement of which with respect to the inner stem is limited by the cooperating pin 13 and slots 14, respectively, in the stem and contactor while the spring 15 urges the contactor so that the left hand faces of the slots 14 tend to engage the pin.

The head 7 includes two separable parts 9 and 16 which are joined together by the bolts 17 when the system is assembled. The part 9 is provided with holes 9a by which the head 7 and its temperature-responsive element 4 may be attached to the wall of a compartment wherein the bulb is to be exposed to the varying conditions of temperature. As herein shown, the head portion 9 is provided with radiating fins 9b by which heat conducted to the head by the bulb is dissipated into the surrounding atmosphere. The part 16 of the head has a recess which is closed by the corrugated diaphragm 18 welded at 19 to the head portion 16 in order to form a chamber 42. The diaphragm 18 is preferably provided with the wear plate 20 against which the telescopic contactor 12 of the inner stem engages.

The mentioned chamber communicates through a fine bore tubing or capillary 21 preferably of metal with a well-known type of pressure-responsive device 22 herein illustrated as being of the Bourdon spring type, although it will be understood that a pressure-responsive device of the bellows or capsular diaphragm type may be employed instead. The tube 21 is preferably welded to the head portion 16 and to the inner end of spring 22 to form a pressure-tight connection therewith. The chamber within the head portion 16 as well as the tube 21 and the Bourdon spring or other pressure-responsive element 22 constituting the closed transmission system, are filled with a liquid or fluid or a combination of both. It is preferred, however, to use mercury as the transmitting medium although it will be understood that the invention is not so limited since glycerin, certain oils or inert gases may be used for the transmission.

In order to compensate for the temperature conditions to which the transmission system including the mercury and the capillary are subjected, a plate 23 of compensating material such as invar is placed in the chamber 42 and the tubing or capillary 21 preferably has therein a core 21a of compensating material. It will be understood that the invar plate 23 compensates the chamber portion 42 of the transmission system against temperature changes while the invar core 21a compensates the capillary tube portion 21 of the transmission system against changes in temperature to which it is exposed. The temperature compensation for the chamber portion of the system is accomplished by properly proportioning the volume of plate 23 as well as the volume of the chamber 42 and by selecting materials having suitable coefficients of expansion for the plate 21, the walls of chamber 42 and the filling liquid or mercury, so that the difference between the expansion or contraction in volume of chamber 42 and the volume of the mercury contained therein is equal to the corresponding change in volume of the invar plate 23 at any given temperature. Likewise the capillary tube portion of the system is similarly compensated by properly proportioning the volume of the tube bore and the volume of the core 21a and by selecting the material of the tube and the core walls, the filling liquid or mercury, so that the difference between the expansion or contraction in volume of the tube bore and the expansion or contraction in volume of the mercury contained therein, is equal to corresponding changes in volume of the invar core 21a at any given temperature. The free end of the spring 22 has secured thereto an arm 24 which through the link 25 actuates the movable pen arm 26 pivoted at 35. This pen arm forms a part of an indicating or recording instrument of which only a fragment of the chart 27 and the case of the clock mechanism 28 thereof are indicated. It will be understood that the actuating spring 22 may also be arranged to operate a temperature-regulating mechanism of any well-known type. As herein shown this regulating mechanism includes a baffle actuating arm 30 which is pivoted at 40 and which is actuated by pen arm 26, through link 29. The member 30 carries a well-known baffle 31 which cooperates with a nozzle 32 to control the operation of a relay or pilot valve 33 in the well-known manner in accordance with movement of the spring 22. This pilot valve controls the flow of air pressure to the actuating top of a regulating valve 34 which, in turn, controls the flow of fuel to heat the compartment wherein the temperature-responsive element 4 is exposed.

In the operation of the system, as the temperature about the element 4 increases, the length of the outside stem 6 increases at a greater rate than that of the inside stem 11. Consequently, the telescopic contactor 12, carried by the inside stem 11, will reduce its pressure on the surface of the wear plate 20, gradually permitting the diaphragm 18 to enlarge the chamber 42. The mercury in the closed transmission system flows into the chamber permitting the Bourdon spring 22 to contract, thereby moving the pen arm 26 toward the center of the chart 27 to make a mark thereon corresponding to the indicated temperature. As the temperature about the element 4 drops, the outside stem 6 contracts carrying with it the inner stem 11. This movement of the inner stem causes the telescopic contactor 12 to force the diaphragm 18 toward the head member 16 to contract the chamber. This forces the mercury in the transmitting system to flow through the capillary 21 thereby causing the Bourdon spring 22 to expand. The movement of this spring causes a corresponding movement of the pen arm toward the outside edge of the chart 27. The mounting of the telescopic contactor 12 prevents destruction of the device in the event that the outside stem 6 contracts beyond the point where the inner stem 11 causes the contactor to force the diaphragm against the compensating plate 23 now engaging the inner wall of head member 16. During such contraction the spring 15 is compressed, permitting the free end of the inner stem to enter the hollow contactor.

It has been mentioned that the head 7 comprises two separable parts 9 and 16 and that the part 9 carries the thermo-sensitive element 4 including the outside stem 6 and the inside stem 11. The part 16, on the other hand, includes the chamber 42 forming with the capillary 21 and the spring 22 the closed transmission system. This mentioned arrangement is particularly advantageous in the manufacture and installation of such systems, since the thermo-sensitive elements having various ranges must be provided and transmission systems having different lengths of capillaries must be furnished. By the present construction, it is possible for the manufacturer to make a limited number of standard lengths of transmission systems to take care of the various conditions encountered in installations, and to make up a limited number of elements for the various ranges, so that a large number of combinations of elements and transmission systems to take care of various requirements can be effected with a minimum number of sizes of elements and transmission systems.

I claim:

1. In an actuating mechanism for a temperature instrument, a support including two separable parts, a temperature-responsive element mounted on the first one of said parts, heat-radiating fins on said first part adjacent the junction thereof with said second part, said second part including a chamber having a flexible wall mechanically actuated by an axial movement of said element, a pressure-responsive device, a capillary tube connecting said chamber and said pressure-responsive device to constitute a transmission system, and fluid in said transmission sytem.

2. In an actuating mechanism for a temperature instrument, a support, a member mounted at one end on said support, a second member secured at one of its ends to the free end of said first member, said members having different coefficients of expansion, a chamber having a flexible wall in operative relation to said second member, a pressure-responsive device, a capillary tube containing fluid connecting said chamber and said pressure-responsive device, and a temperature compensating core in said capillary tube.

3. In an actuating mechanism for a temperature-responsive instrument, a thermo-sensitive element including two members having different coefficients of expansion, a closed transmission system including a chamber, a pressure-responsive device and a capillary tube through which said chamber communicates with said device, temperature compensating means in said chamber, said members being mounted to apply to said fluid through the wall of said chamber forces proportional to the differential expansion of said members.

EDWARD B. FOOTE.